(12) United States Patent
Kim et al.

(10) Patent No.: US 11,766,967 B2
(45) Date of Patent: Sep. 26, 2023

(54) OUTSIDE MIRROR TYPE DISPLAY APPARATUS FOR VEHICLE HAVING FOLDING DISPLAY UNIT

(71) Applicants: HYUNDAI MOTOR COMPANY, Seoul (KR); KIA MOTORS CORPORATION, Seoul (KR)

(72) Inventors: Han-Jun Kim, Incheon (KR); Un-Tae Kim, Gwangmyeong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 267 days.

(21) Appl. No.: 17/069,533

(22) Filed: Oct. 13, 2020

(65) Prior Publication Data
US 2022/0009416 A1  Jan. 13, 2022

(30) Foreign Application Priority Data
Jul. 7, 2020  (KR) .......................... 10-2020-0083360

(51) Int. Cl.
*B60R 1/00* (2022.01)
*G09G 3/00* (2006.01)
(Continued)

(52) U.S. Cl.
CPC .............. *B60R 1/006* (2013.01); *G06V 20/58* (2022.01); *G09G 3/035* (2020.08); *H04N 23/54* (2023.01);
(Continued)

(58) Field of Classification Search
CPC ...... B60K 2370/1533; B60K 2370/173; B60K 2370/21; B60K 2370/67; B60K 2370/779; B60K 2370/794; B60K 35/00; B60K 37/00; B60R 1/006; B60R 11/0235; B60R 2011/0082; B60R 2011/0085; B60R 2011/0092; B60R 2300/105; B60R 2300/20; B60R 2300/307; B60R 2300/802; B60R 1/00; B60R 1/074; G06V 20/58; G09G 2330/026; G09G 2354/00; G09G 2380/02; G09G 2380/10; G09G 3/035;
(Continued)

(56) References Cited

U.S. PATENT DOCUMENTS

2012/0314075 A1* 12/2012 Cho .......................... B60R 1/00
348/148
2014/0285666 A1* 9/2014 O'Connell ................ B60R 1/12
348/148

(Continued)

FOREIGN PATENT DOCUMENTS

FR          3110510 A1 * 11/2021
JP          2010-116125     5/2010
(Continued)

*Primary Examiner* — Richard J Hong
(74) *Attorney, Agent, or Firm* — Fox Rothschild LLP

(57) ABSTRACT

A display apparatus used for a vehicle is provided. The display apparatus may include a display unit configured to show an external environment around the vehicle and having flexibility, and a housing configured to support the display unit, in which the display unit is folded when the display apparatus is not used, the display unit is unfolded when the display apparatus is used, and an operation of the display unit is performed by a drive unit embedded in the housing.

13 Claims, 20 Drawing Sheets

(51) Int. Cl.
*G06V 20/58* (2022.01)
*H04N 23/54* (2023.01)

(52) U.S. Cl.
CPC ..... *B60R 2300/105* (2013.01); *B60R 2300/20* (2013.01); *B60R 2300/307* (2013.01); *B60R 2300/802* (2013.01); *G09G 2354/00* (2013.01); *G09G 2380/02* (2013.01); *G09G 2380/10* (2013.01)

(58) Field of Classification Search
CPC .. H04N 5/2253; H05K 5/0226; G08G 1/0967; G08G 1/168; H10K 59/40
See application file for complete search history.

(56) References Cited

U.S. PATENT DOCUMENTS

| | | | |
|---|---|---|---|
| 2016/0216128 A1* | 7/2016 | Takano | B60R 1/00 |
| 2017/0083047 A1* | 3/2017 | Hélot | H10K 59/40 |
| 2017/0349098 A1* | 12/2017 | Uhm | G08G 1/0967 |
| 2018/0361931 A1* | 12/2018 | Ajisaka | H04N 5/2253 |
| 2019/0161014 A1 | 5/2019 | Ko et al. | |
| 2020/0137905 A1* | 4/2020 | Redeker | B60R 11/0235 |
| 2021/0155167 A1* | 5/2021 | Lynam | G08G 1/168 |
| 2021/0206265 A1* | 7/2021 | Song | B60K 35/00 |
| 2021/0206266 A1* | 7/2021 | Shim | B60K 37/00 |
| 2021/0212225 A1* | 7/2021 | Song | H05K 5/0226 |
| 2021/0362653 A1* | 11/2021 | Beauregard | B60R 1/074 |

FOREIGN PATENT DOCUMENTS

| | | |
|---|---|---|
| JP | 2016-037109 | 3/2016 |
| KR | 10-0273867 | 9/2000 |
| KR | 10-2019-0001082 | 1/2019 |

\* cited by examiner

WHEN FOLDED

WHEN DEPLOYED

OUTSIDE MIRROR TYPE DISPLAY APPARATUS FOR VEHICLE HAVING FOLDING DISPLAY UNIT

CROSS-REFERENCE TO RELATED APPLICATION

The present application claims priority to and the benefit of Korean Patent Application No. 10-2020-0083360, filed on Jul. 7, 2020, the disclosure of which is incorporated herein by reference in its entirety.

TECHNICAL FIELD

The present disclosure relates to a display apparatus used for a vehicle, and more particularly, to a display apparatus for a vehicle, which is positioned to be flush with an interior part of a vehicle and has a display unit which is folded or unfolded by a drive unit provided in the display apparatus.

BACKGROUND

Recently, as an outside mirror for a vehicle, an electronic CMS (Camera based Monitoring System) is commercially available, and the electronic CMS has an inherent function of showing an area behind the vehicle, and has a camera configured to capture an image of the area behind the vehicle, and a display means configured to display the image, thereby improving performance of the vehicle and implementing high-grade design.

The outside mirror to which the electronic CMS is applied has a limitation in that a structure for showing an external environment around the vehicle to a driver needs to be provided in an internal space of the vehicle, which reduces a degree of freedom of designing an interior of the vehicle.

Therefore, the outside mirror in the related art, to which the CMS is applied, adopts a display having a small area because of a small space in the vehicle. Further, if the display is installed at a position at which the display occludes a front window of the vehicle, a visual field of the driver may be obstructed.

The outside mirror in the related art, to which the CMS is applied, is configured such that the display is installed in a space portion additionally formed in the interior space of the vehicle or installed in an interior space, the shape of which is changed. As a result, there is concern that an unexpected problem may occur in terms of the interior structure of the vehicle.

If the display is installed outside the vehicle, there is no great difference in function from a function of ensuring a rear visual field of the mirror-type outside mirror in the related art, and as a result, the necessity of applying the CMS is decreased.

SUMMARY

The present disclosure provides an outside mirror type display apparatus for a vehicle, in which a display unit is mounted in an interior space of a vehicle to show an area behind the vehicle, the display apparatus occupies a small interior space of the vehicle, the display apparatus is maximally maintained at a position identical to a position of a mirror type outside mirror in the related art not to cause unnecessary repulsion to a driver, and an optimum viewing angle to an external environment around the vehicle may be adjusted and provided by tilting the display unit in accordance with a viewing angle of the driver.

An exemplary embodiment of the present disclosure provides an outside mirror type display apparatus for a vehicle, in which the display apparatus is positioned to be flush with an interior part of a vehicle, and a display unit is folded or unfolded by a drive unit provided in the display apparatus.

According to the outside mirror type display apparatus for a vehicle according to the present disclosure configured as described above, the display apparatus occupies a small interior space of the vehicle because of the structure in which the display apparatus is installed at a position identical to a position of a mirror type outside mirror in the related art and the display unit is variously deployed. As a result, the outside mirror, to which a CMS is applied, may be provided without degrading a degree of freedom of designing an interior of the vehicle.

Since the display unit is structured to be tilted in a left-right direction, it is possible to maximally ensure a rear visual field required to drive the vehicle.

The display unit may display an image of an area in front of the vehicle and an image of an area beside the vehicle, such that various visual fields of the driver may be ensured, thereby contributing to safe driving.

DRAWINGS

FIGS. 1A to 1C are configuration views of an outside mirror type display apparatus for a vehicle according to the present disclosure, in which FIG. 1A is a perspective view of the display apparatus, FIG. 1B is a perspective view illustrating a state in which a display unit of the display apparatus is deployed, and FIG. 1C is a view illustrating a state in which the display apparatus is installed.

FIGS. 4A to 4C are detailed views of the drive unit of the display apparatus according to the present disclosure, in which FIG. 4A is a perspective view of the drive unit, FIG. 4B is a view illustrating a state in which a first motor of the drive unit operates, and FIG. 4C is a view illustrating a state in which a second motor of the drive unit operates.

Figure 6A:
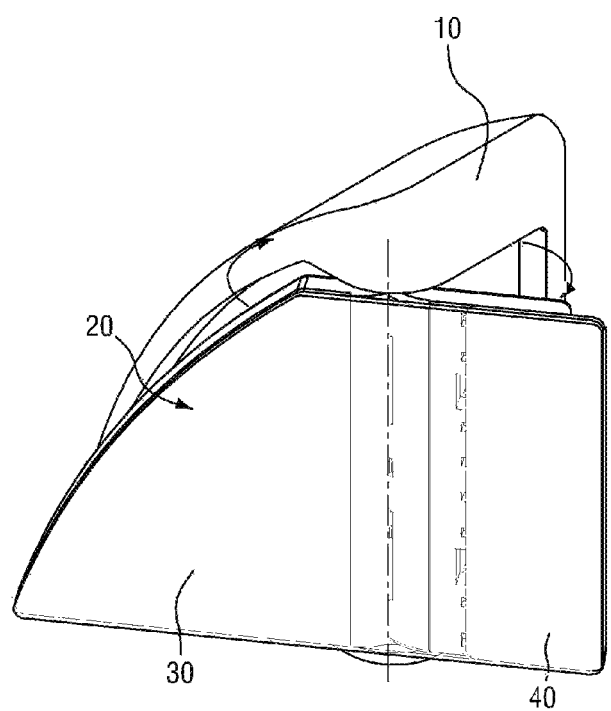
Figure 6B:
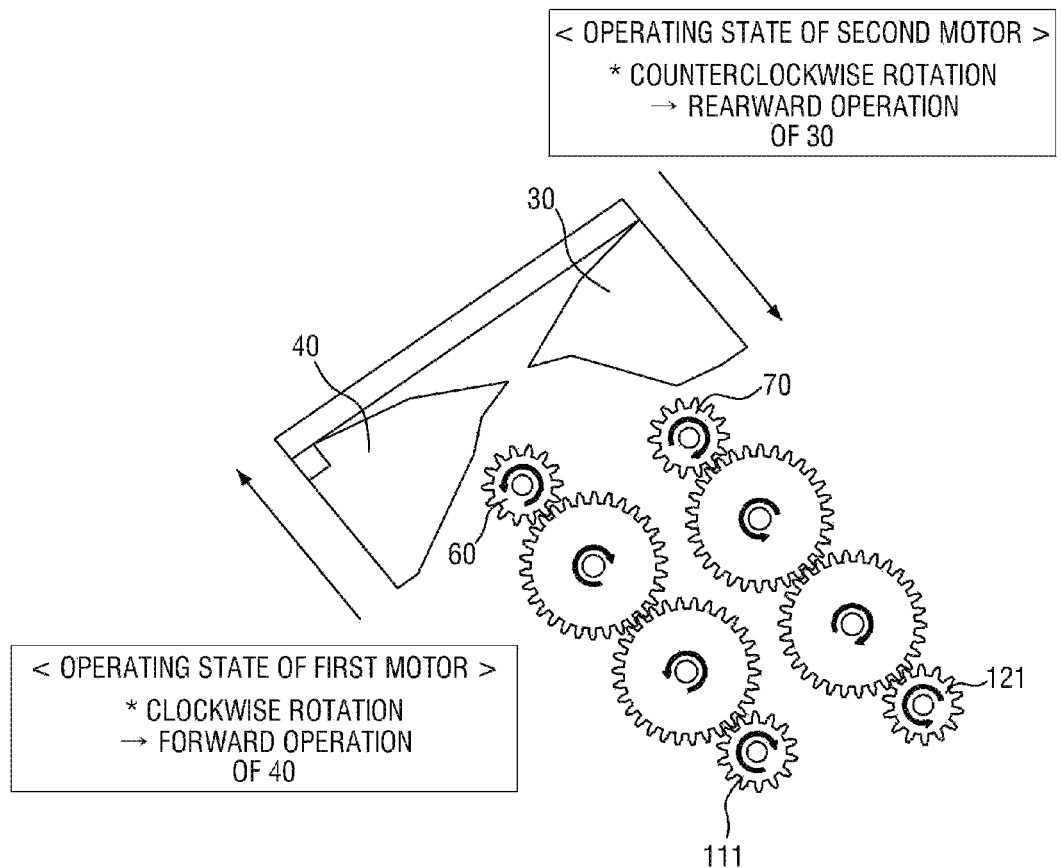
Figure 7A:
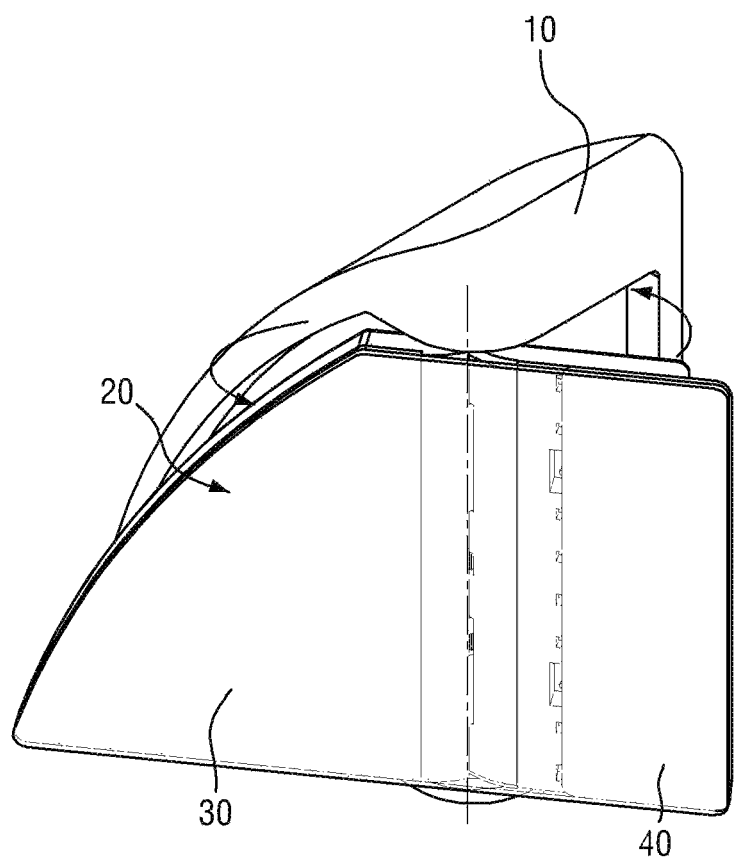
Figure 7B:
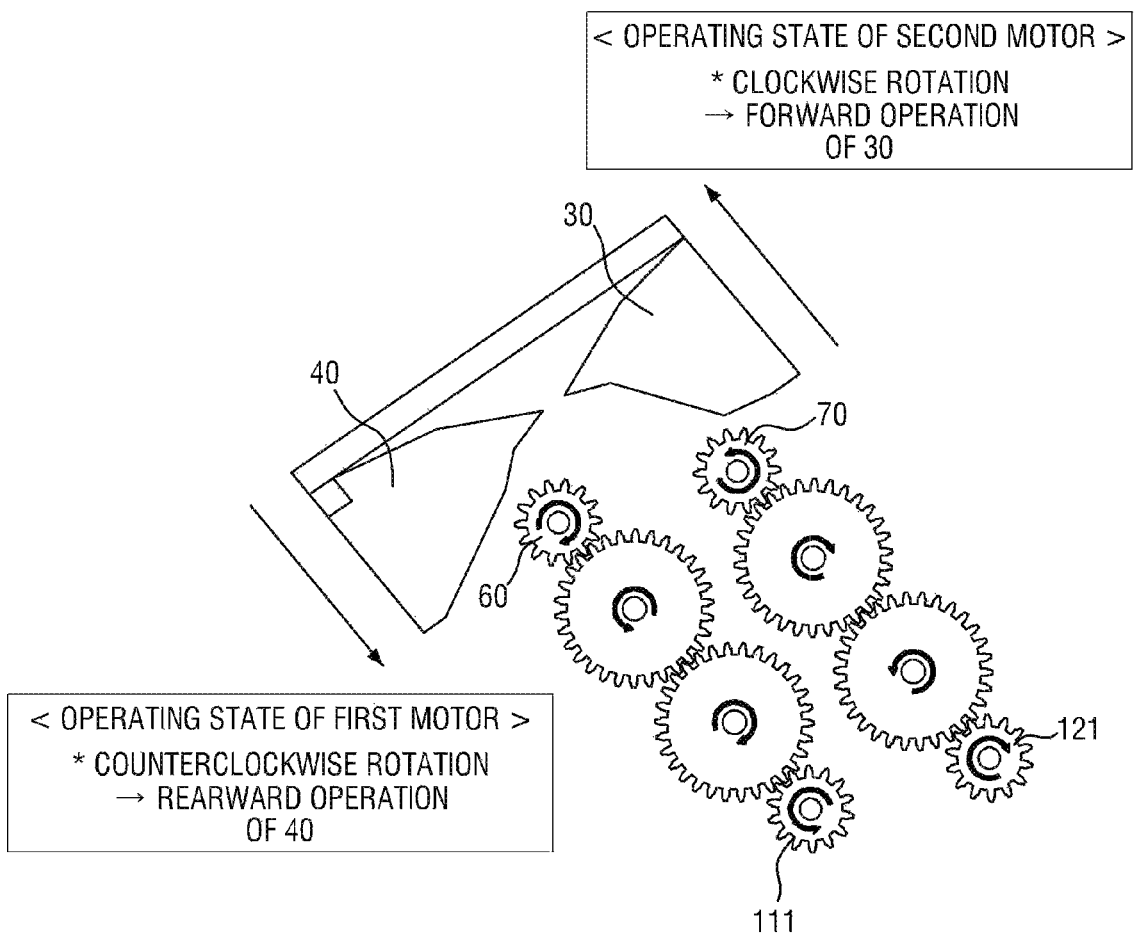

FIGS. 6A, 6B, 7A, and 7B are operating state views illustrating states in which the display unit of the display apparatus according to the present disclosure is tilted, in which FIG. 6A is a view illustrating a state in which the display unit is tilted leftward, FIG. 6B is a view illustrating a state in which the drive unit operates by being tilted leftward, FIG. 7A is a view illustrating a state in which the drive unit is tilted rightward, and FIG. 7B is a view illustrating a state in which the drive unit operates by being tilted rightward.

Figure 8A:
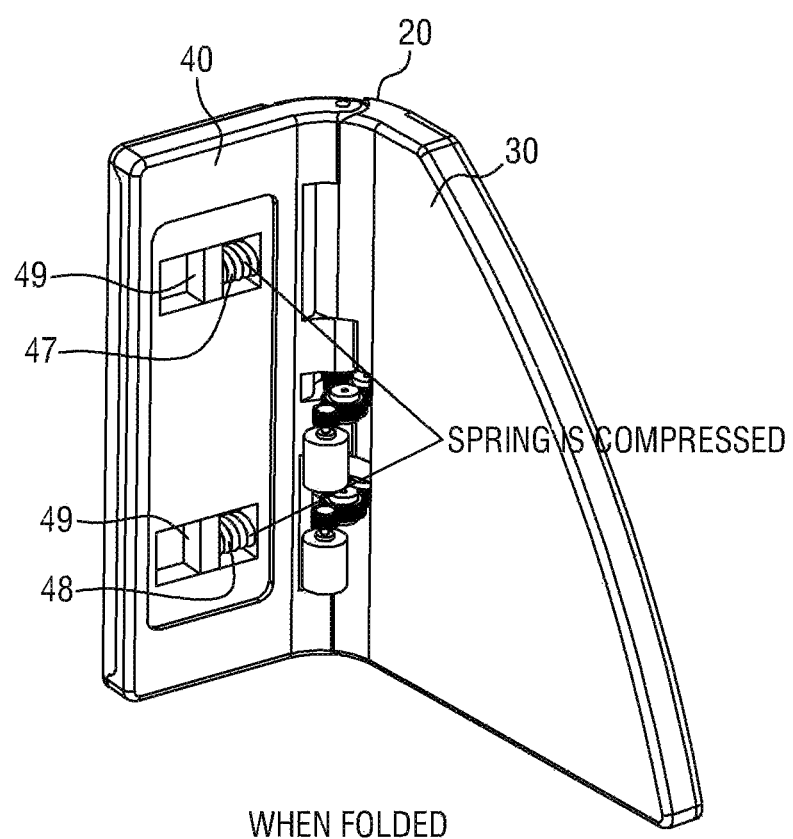
Figure 8B:
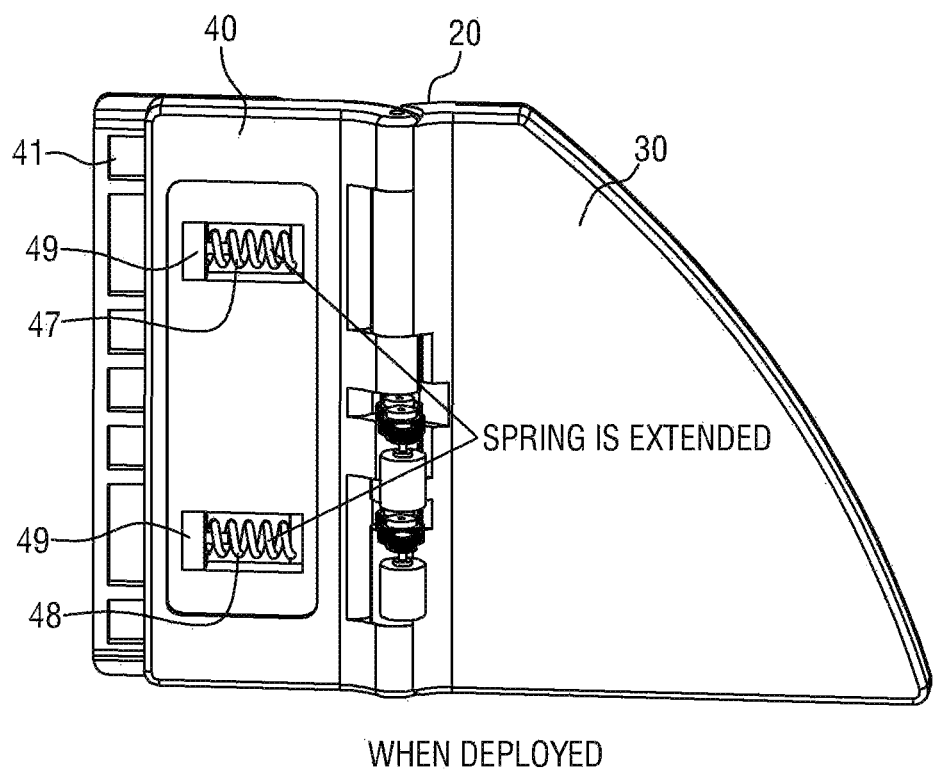

FIGS. 8A and 8B are perspective views illustrating a state in which a spring operates when the display unit of the display apparatus according to the present disclosure is folded and unfolded.

Figure 9:
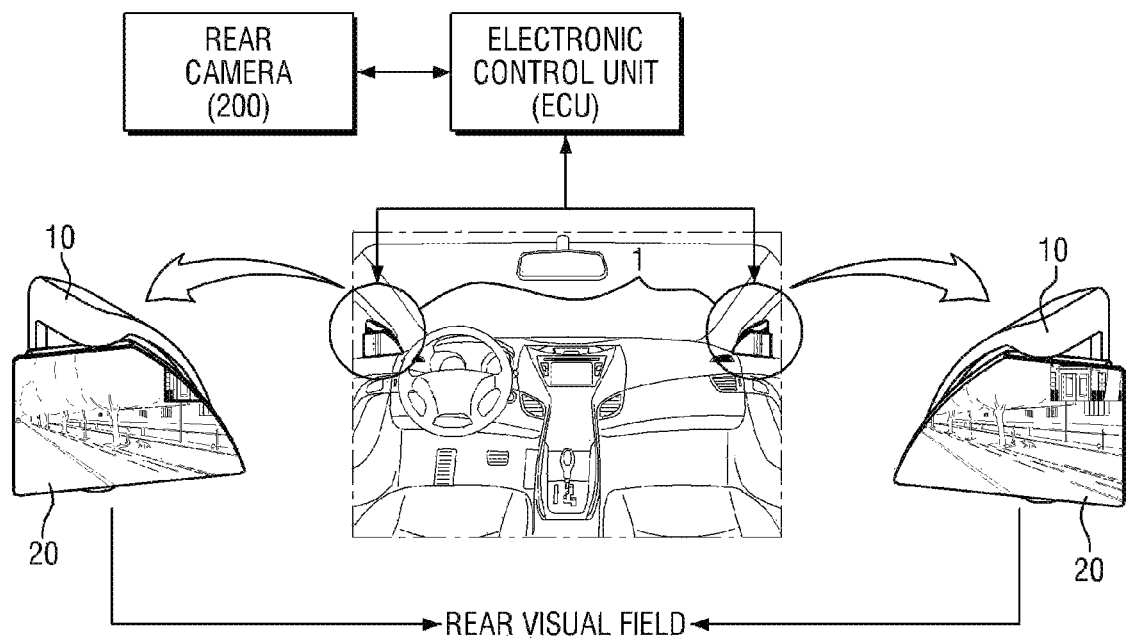

FIG. 9 is a view illustrating an interior space of a vehicle when the display apparatus according to the present disclosure displays an area behind the vehicle.

Figure 10:
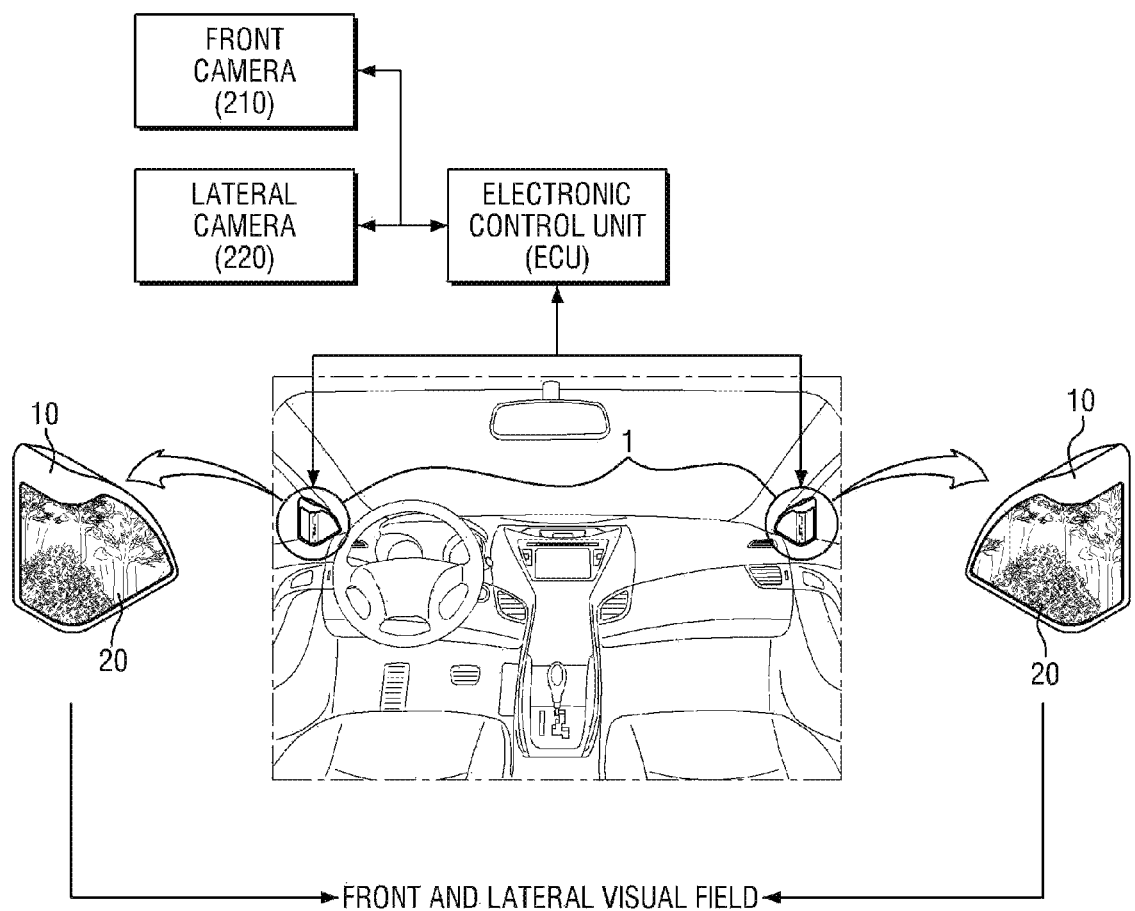

FIG. 10 is a view illustrating the interior space of the vehicle when the display apparatus according to the present disclosure displays an area in front of or beside the vehicle.

Figure 11:
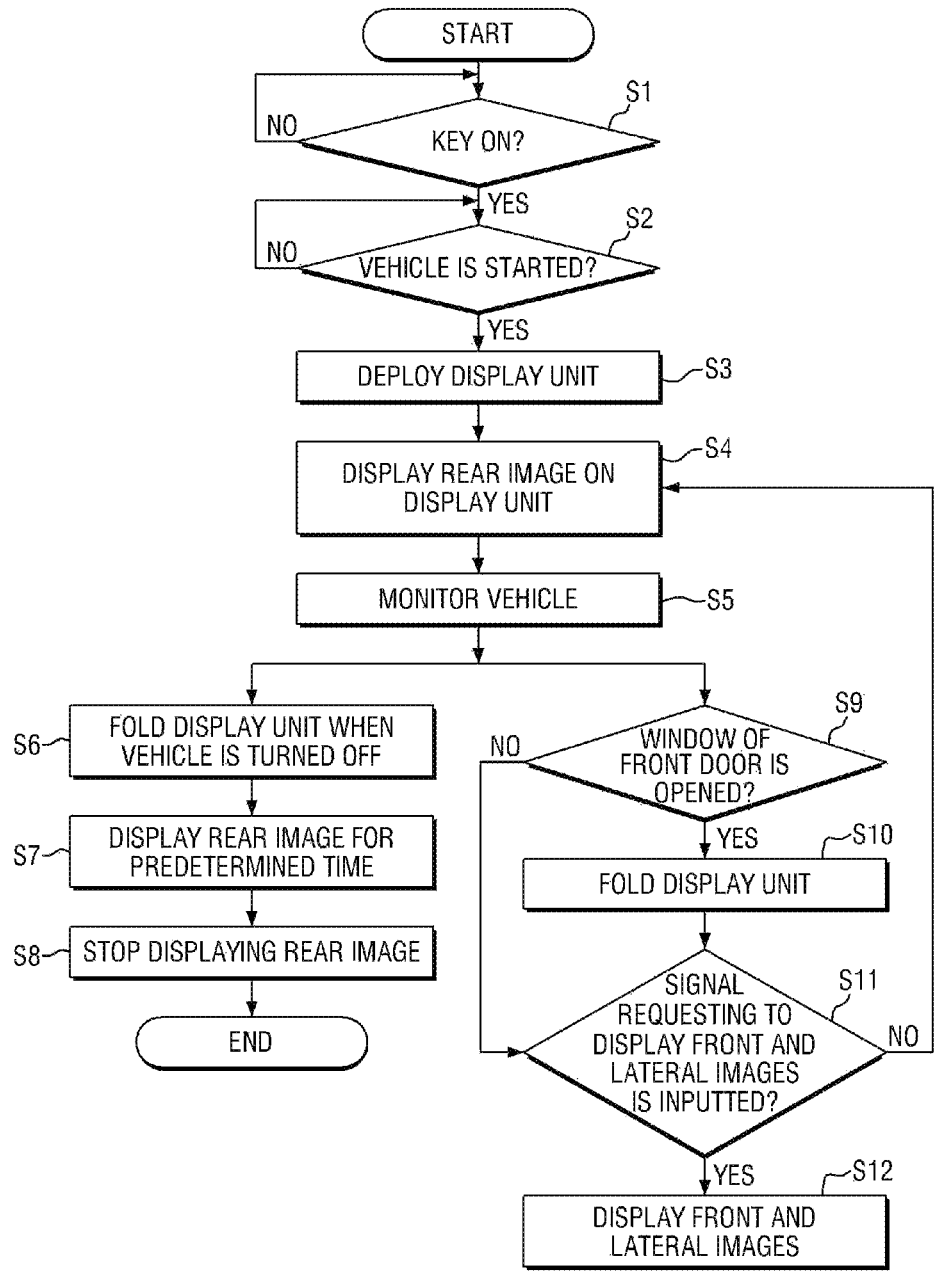
Figure 12:
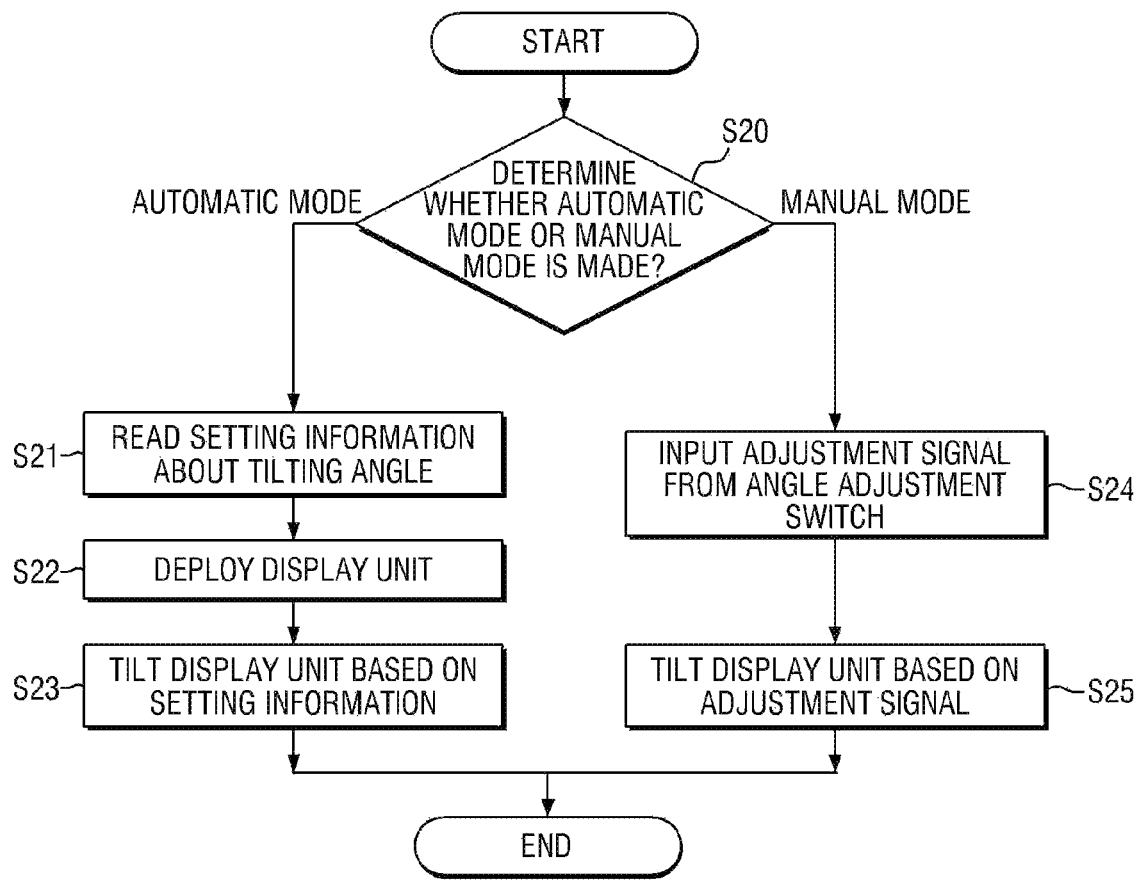

FIGS. 11 and 12 are flowcharts of methods of controlling the display apparatus according to the present disclosure, in which FIG. 11 is a flowchart of a control method when deploying the display unit of the display apparatus, and FIG. 12 is a flowchart of a control method when tilting the display unit of the display apparatus.

DETAILED DESCRIPTION

Hereinafter, a configuration and an operation of an outside mirror type display apparatus for a vehicle according to the present disclosure will be described in detail with reference to the drawings.

However, the disclosed drawings are provided as an example for fully transferring the spirit of the present disclosure to those skilled in the art. Therefore, the present disclosure is not limited to the drawings disclosed below and may be specified as other aspects.

Unless otherwise defined, the terminologies used in the specification of the present disclosure have the meanings that a person with ordinary skill in the technical field to which the present disclosure pertains typically understands, and in the following description and the accompanying drawings, a detailed description of publicly known functions and configurations will be omitted so as to avoid unnecessarily obscuring the subject matter of the present disclosure.

Referring to technologies in the related art, Korean Patent Laid-Open No. 10-1998-3522 discloses a layout structure of a display for a vehicle, in which a display panel may be extended upward and retracted, thereby enabling a screen on a display to be easily observed without obstructing a visual field while driving the vehicle. However, there is a limitation in ensuring a visual field of a driver because the display panel is operated merely upward or downward. As a result, there is a drawback in that a separate space needs to be provided to ensure a structure for mounting the display in the interior of the vehicle.

Korean Patent Application Laid-Open No. 10-2019-1082 discloses a side mirrorless vehicle having a configuration of a mirror provided with a reflective mirror that reflects a rear appearance and displays in real time images captured by left and right cameras. However, there are problems in that it is difficult to ensure a space for installing the cameras and the mirror installed in the vehicle and manufacturing costs are increased because the two cameras are used.

Japanese Patent Application Laid-Open No. JP2010-116125 discloses a driving support apparatus provided with a rear-view assistance device having a moving means that moves an electronic display system between the inside and the outside of a vehicle so that the rear view can be recognized when the electronic display system fails. However, there is a structural limitation in designing an interior of the vehicle because a space for storing the device needs to be provided in a vehicle body.

Japanese Patent Application Laid-Open No. JP2016-037109 discloses a rear-view device structured to improve aerodynamic performance by using a camera system and recognize an area behind a vehicle when a camera is broken down. However, a mirror part protrudes outward, an angle of the mirror is set toward a driver seat, and as a result, there is concern that light blindness is caused by light reflection, which may hinder safe driving. Further, because the device is mounted on a lateral surface of the vehicle, there is concern that a front visual field and a lateral visual field of a driver may be blocked.

U.S. Patent Application Publication No. US2019-161014 discloses an apparatus and a method for controlling a side mirror system for a vehicle, in which a side mirror camera system for a vehicle is fixed outside the vehicle, and as necessary, a reflective panel protrudes by moving between the inside and the outside of the vehicle, such that an external visual field is ensured by using a reflective mirror. However, there is a structural limitation in designing an interior of the vehicle because a separate installation space needs to be provided in an interior space of the vehicle. Further, there is concern that a structure for mounting an auxiliary mirror on a part of an outer cover violates the regulations.

Figure 1A:
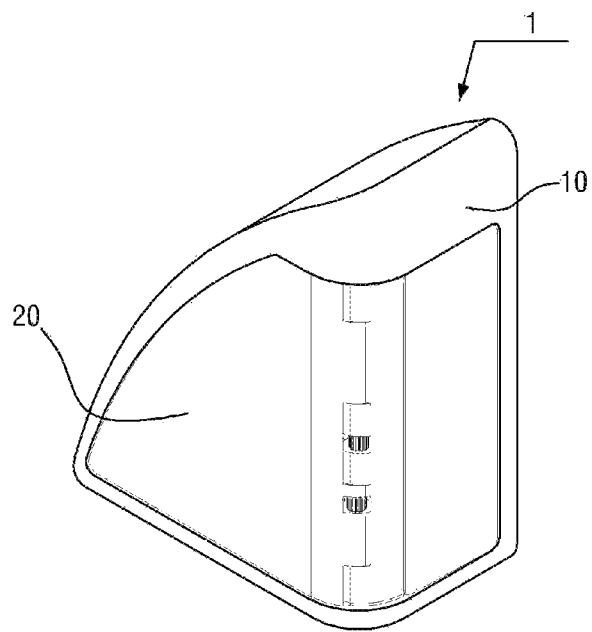
Figure 1B:
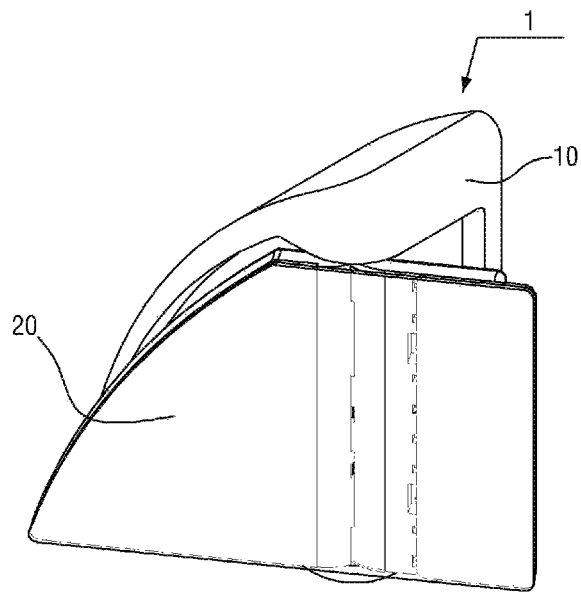
Figure 1C:
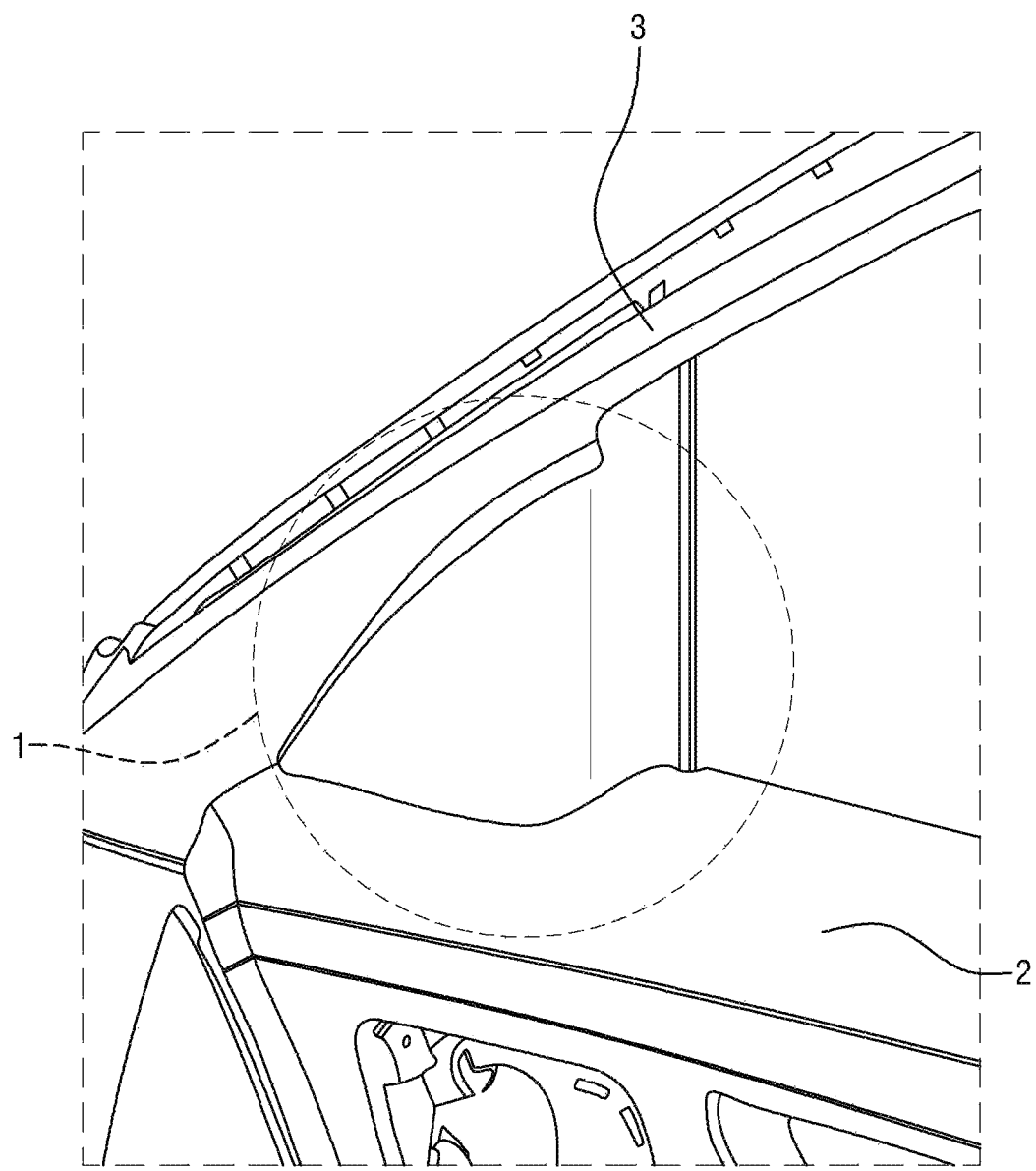

FIGS. 1A to 1C are configuration views of an outside mirror type display apparatus for a vehicle according to the present disclosure, in which FIG. 1A is a perspective view of the display apparatus, FIG. 1B is a perspective view illustrating a state in which a display unit of the display apparatus is deployed, and FIG. 1C is a view illustrating a state in which the display apparatus is installed.

Referring to FIG. 1A, an outside mirror type display apparatus 1 for a vehicle according to the present disclosure includes a display unit 20 configured to show an external environment around a vehicle, and a housing 10 configured to support the display unit 20.

The display unit 20 of the display apparatus 1 according to the present disclosure adopts a variable display member with a flexible panel. The variable display member is a well-known member currently adopted in mobile communication devices such as smartphones.

Therefore, as illustrated in FIG. 1B, in the display apparatus according to the present disclosure, the display unit 20 having the variable display member is configured to be folded or unfolded. The operation of folding or unfolding the display unit 20 may be performed by a drive unit 100 which is embedded in a housing 10 and will be described below.

In the display apparatus 1 according to the present disclosure, the display unit 20 may be unfolded and deployed when the vehicle is started.

As illustrated in FIG. 1C, the display apparatus 1 according to the present disclosure may be positioned to be flush with an interior part of the vehicle. In particular, the display apparatus 1 may be installed at a position at which a front lower portion of a window frame 3 and a door upper portion 2 meet together at a driver seat and an auxiliary seat of the vehicle.

This position is a point corresponding to a quarter glass trim portion of a front door part where a mirror type outside mirror in the related art is typically coupled outside the window frame 3. That is, this position is a point which is maximally adjacent to a position at which the mirror type outside mirror in the related art is installed, thereby ensuring an external visual field at the same level as the mirror type outside mirror in the related art without causing unnecessary repulsion to a driver. In particular, this position is a point at which the display unit 20 may be easily tilted in accordance with a viewing angle of the driver.

Figure 2:
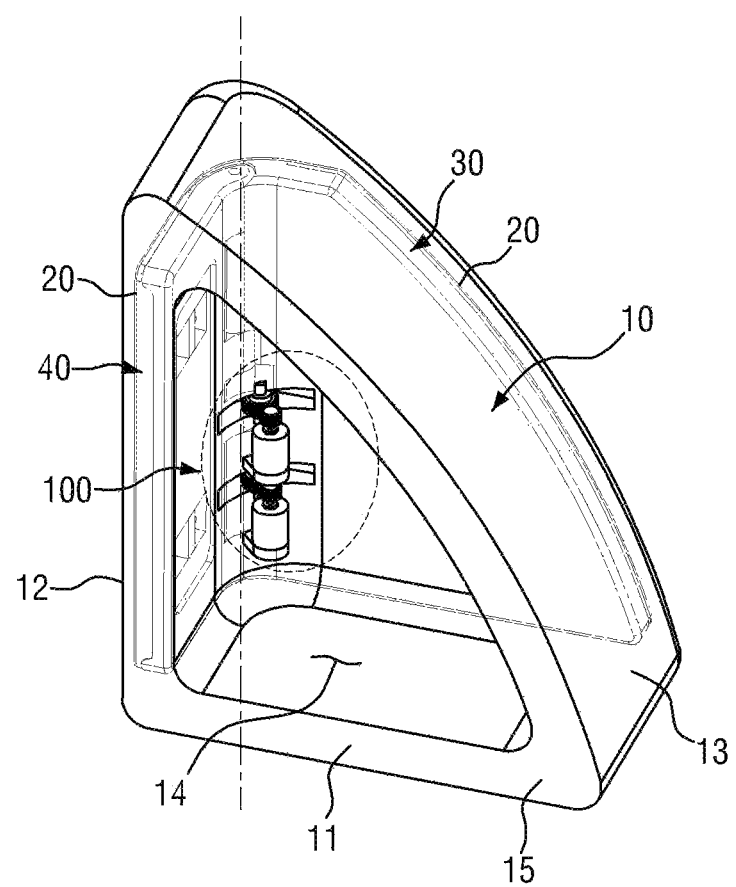
FIG. 2 is a perspective view illustrating an interior of the display apparatus according to the present disclosure.
Figure 3:
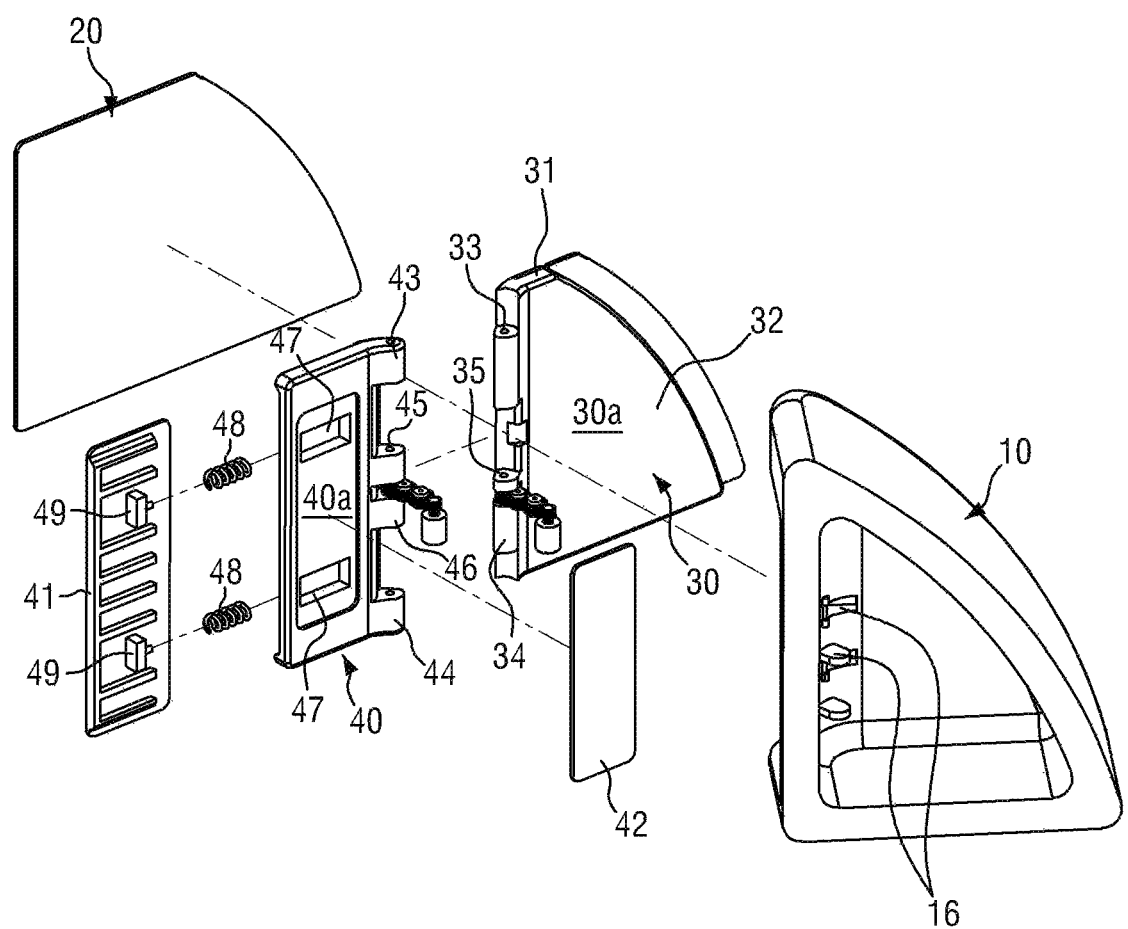
FIG. 3 is an exploded perspective view of the display apparatus according to the present disclosure.

FIG. 2 is a perspective view illustrating an interior of the display apparatus according to the present disclosure, and FIG. 3 is an exploded perspective view of the display apparatus according to the present disclosure.

First, referring to FIG. 2, in the display apparatus 1 according to the present disclosure, the display unit 20 having flexibility is coupled outside the housing 10, the display unit 20 is mounted on a surface of an auxiliary mount 40 and a surface of a main mount 30, the auxiliary mount 40 is positioned on a front surface 12 of the housing 10, the main mount 30 is positioned on a lateral surface 15 of the housing 10, and the main mount 30 and the auxiliary mount 40 are moved by an operation of the drive unit 100 installed in a space portion 14 in the housing 10, such that the display unit 20 is unfolded or folded.

The housing 10 has a triangular box shape including a bottom surface 11, the front surface 12, a rear surface 13 extending inclinedly toward the bottom surface 11 from an upper portion of the front surface 12 so that the bottom surface 11 may be entirely installed on the quarter glass trim portion of the front door part, and the lateral surfaces 15 formed at left and right sides of the front surface 12. The vacant space portion 14 is provided in the housing 10, and the drive unit 100 configured to operate the main mount 30 and the auxiliary mount 40 is installed in the space portion 14.

The display unit 20, which has an area capable of covering the front surface 12 and one lateral surface 15 of the housing 10, may be installed on the housing 10 so as to be deployable or foldable.

In this case, the display unit 20 is mounted on the surface of the main mount 30 and the surface of the auxiliary mount 40, and the main mount 30 and the auxiliary mount 40 are coupled to the housing 10 by means of hinges inserted into two splits 16 formed at one edge of the front surface 12 of the housing 10.

Referring to FIG. 3, the main mount 30 has a flat-plate-shaped body 30a having a front surface 31 on which the display unit 20 is mounted, and a rear surface 32 which is in contact with the lateral surface 15 of the housing 10. An upper hinge 33, a center hinge 35, and a lower hinge 34 are sequentially provided on a lateral surface of the body 30a in a direction from an upper side to a lower side of the lateral surface of the body 30a.

The auxiliary mount 40 has a body 40a having a front surface to which a front cover 41 is attached, and a rear surface to which a rear cover 42 is attached. Long holes 47 into which springs 48 are inserted are formed in upper and lower portions of the body 40a.

Pushers 49 are provided on the front cover 41 and inserted into the long holes 47 to push the springs 48 toward one side. The rear cover 42 is attached to the body 40a in order to shield the rear surface of the body 40a.

On the lateral surface of the body 40a of the auxiliary mount 40, an upper coupling hinge 43 and a center upper coupling hinge 45 are provided to be coupled to the upper hinge 33 of the main mount 30, a center lower coupling hinge 35 is provided to be coupled to the center hinge 35 of the main mount 30, and a lower coupling hinge 44 is provided to be coupled to the lower hinge 34 of the main mount 30.

In this case, the main mount 30 and the auxiliary mount 40 are folded or unfolded with respect to the hingedly coupled portion in order to perform the operation of unfolding (deploying) and folding the display unit 20 mounted on the surface of the main mount 30 and the surface of the auxiliary mount 40. In order to perform the operation, the drive unit 100 configured to operate the main mount 30 and the auxiliary mount 40 is installed in the internal space portion 14 of the housing 10.

Figure 4A:
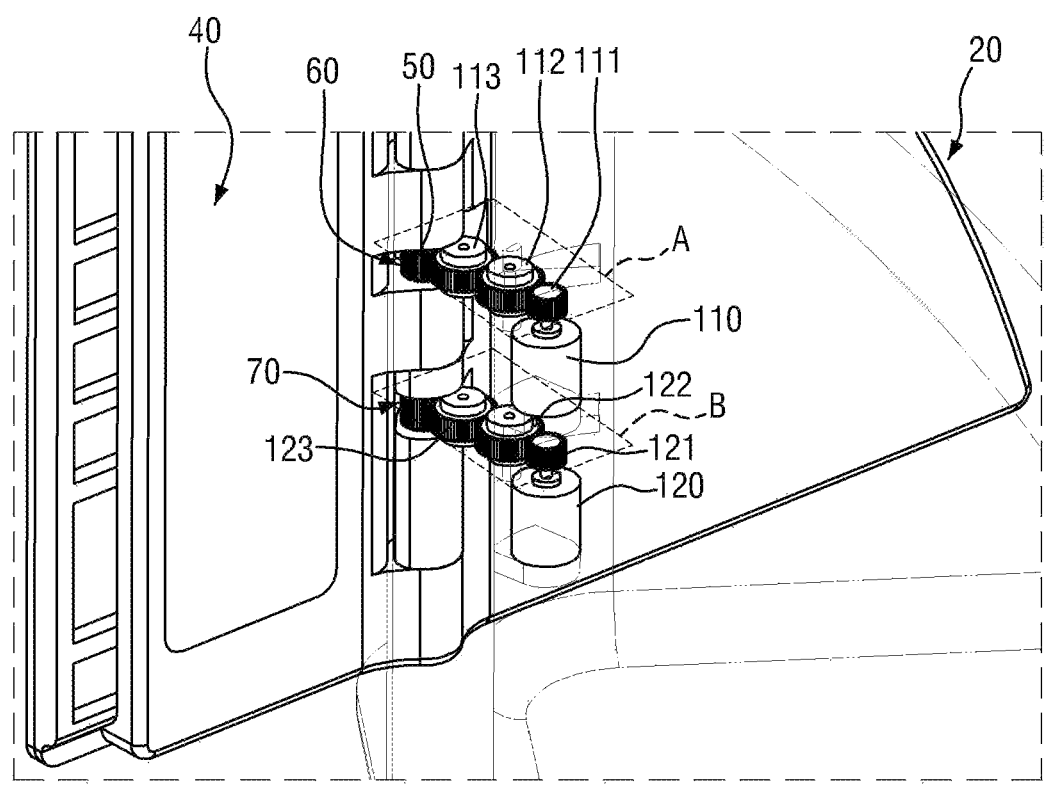
Figure 4B:
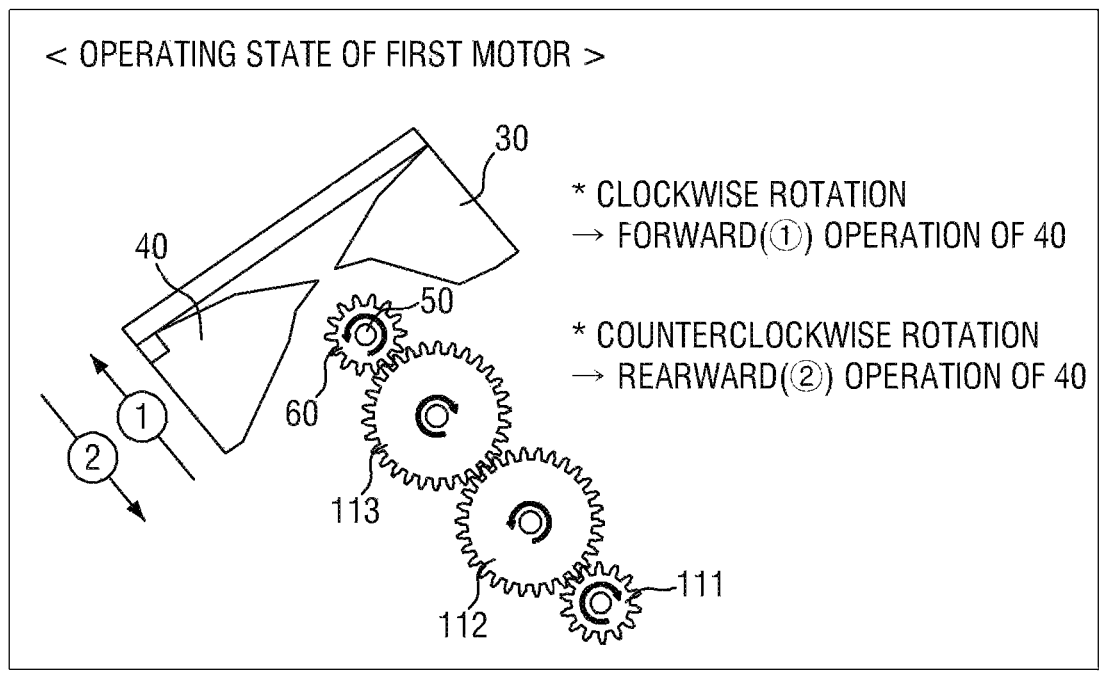
Figure 4C:
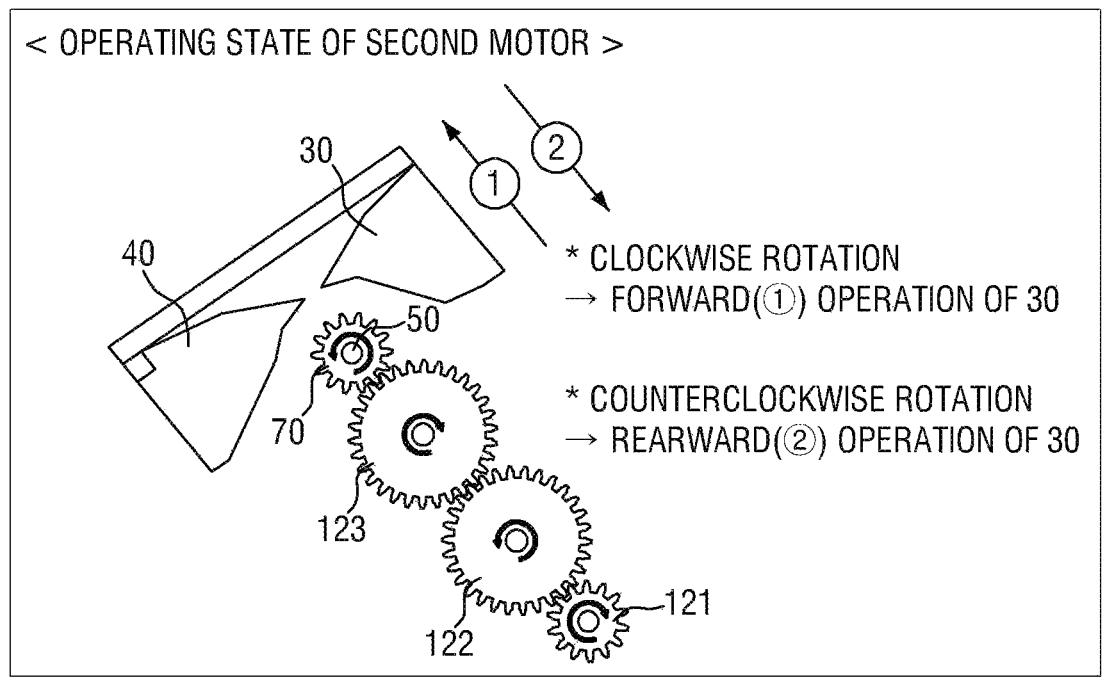

FIGS. 4A to 4C are detailed views of the drive unit of the display apparatus according to the present disclosure, in which FIG. 4A is a perspective view of the drive unit, FIG. 4B is a view illustrating a state in which a first motor of the drive unit operates, and FIG. 4C is a view illustrating a state in which a second motor of the drive unit operates.

First, referring to FIG. 4A, the drive unit 100 includes a first motor 110 configured to provide power for moving the auxiliary mount 40 forward or rearward, and a second motor 120 configured to provide power for moving the main mount 30 forward or rearward.

The drive unit 100 includes a driving gear 111 coupled to a shaft of the first motor 110, a pair of driven gears 112 and 113 engaging with the driving gear 111 and configured to transmit rotational force, and an upper driven gear 60 interposed between the center upper coupling hinge 45 and the center lower coupling hinge 46 of the auxiliary mount 40 and engaging with the driven gear 113 at a rear end.

In this case, the upper driven gear 60 is rotated about a shaft 50 by the rotational force transmitted from the driven gears 112 and 113 and rotates both the center upper coupling hinge 45 and the center lower coupling hinge 46, which are penetrated by the shaft 50, thereby moving the auxiliary mount 40 forward or rearward.

Specifically, as illustrated in FIG. 4B illustrating a top plan view of part A in FIG. 4A, when the driving gear 111 of the first motor 110 is rotated clockwise, the rotational force is transmitted, such that the upper driven gear 60 is rotated counterclockwise, and the auxiliary mount 40 is moved forward (in a direction indicated by 1). When the driving gear 111 of the first motor 111 is rotated counterclockwise, the rotational force is transmitted, such that the upper driven gear 60 is rotated clockwise, and the auxiliary mount 40 is moved rearward (in a direction indicated by 2).

Meanwhile, in order to assuredly transmit the rotational force from the upper driven gear 60, a gear train (not illustrated), which engages with the upper driven gear 60, may be provided on a sidewall of the auxiliary mount 40 between the center upper coupling hinge 45 and the center lower coupling hinge 46 of the auxiliary mount 40.

The drive unit 100 includes a driving gear 121 coupled to a shaft of the second motor 120, a pair of driven gears 122 and 123 engaging with the driving gear 121 and configured to transmit rotational force, and a lower driven gear 70 interposed between the center hinge 35 and the lower hinge 34 of the main mount 30 and engaging with the driven gear 123 at the rear end.

In this case, the lower driven gear 70 is rotated about the shaft 50 by the rotational force transmitted from the driven gears 122 and 123 and rotates both the center hinge 35 and the lower hinge 34, which are penetrated by the shaft 50, thereby moving the main mount 30 forward or rearward.

Specifically, as illustrated in FIG. 4C illustrating a top plan view of part B in FIG. 4A, when the driving gear 121 of the second motor 120 is rotated clockwise, the rotational force is transmitted, such that the lower driven gear 70 is rotated counterclockwise, and the main mount 30 is moved forward (in the direction indicated by 1). When the driving gear 121 of the second motor 120 is rotated counterclockwise, the rotational force is transmitted, such that the lower driven gear 70 is rotated clockwise, and the main mount 30 is moved rearward (in the direction indicated by 2).

Meanwhile, in order to assuredly transmit the rotational force from the lower driven gear 70, a gear train (not illustrated), which engages with the lower driven gear 70, may be provided on a sidewall of the main mount 30 between the center hinge 35 and the lower hinge 34 of the main mount 30.

Figure 5A:
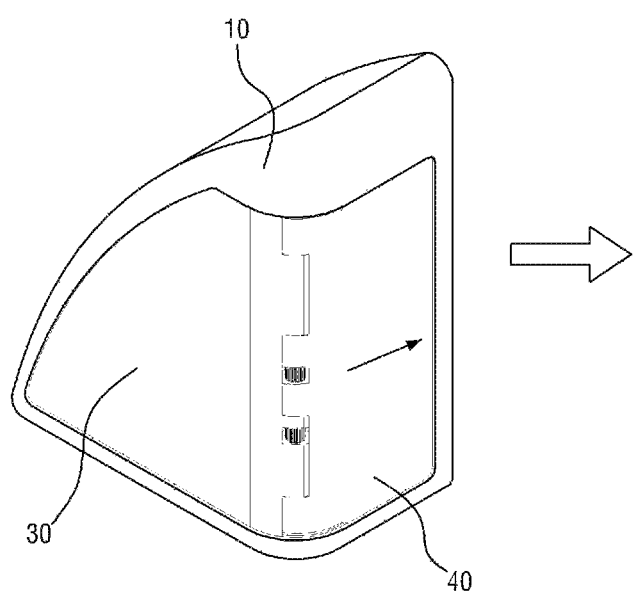
FIGS. 5A to 5C are operating state views illustrating a process in which the display unit of the display apparatus according to the present disclosure is deployed.
Figure 5B:
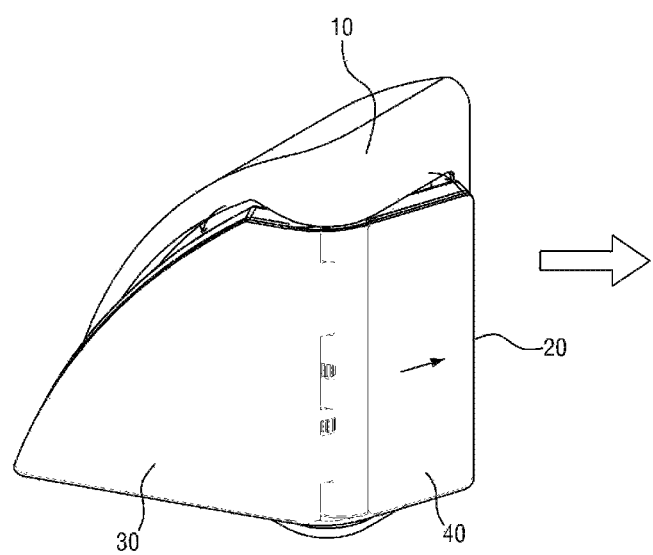
Figure 5C:
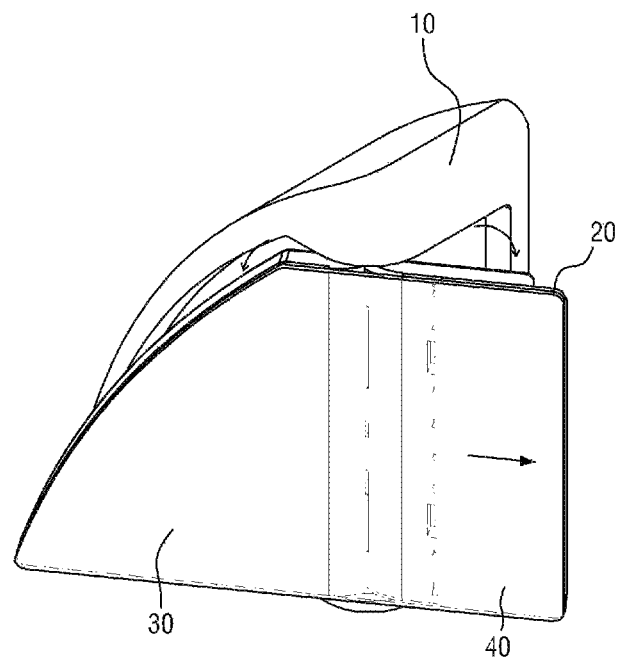

FIGS. 5A to 5C are operating state views illustrating a process in which the display unit of the display apparatus according to the present disclosure is deployed. FIGS. 5A to 5C illustrate states in which the main mount 30 and the auxiliary mount 40 are unfolded and deployed by the rotations of the first and second motors 110 and 120 of the drive unit 100 described above with reference to FIGS. 4B and 4C.

That is, when the vehicle is started in a state in which the main mount 30 and the auxiliary mount 40 are folded on the front surface 12 and the lateral surface 15 of the housing 10 in the left state (FIG. 5A) in the display apparatus 1 according to the present disclosure, the first motor 110 and the second motor 120 are rotated by automatic control or a manual manipulation of the driver, such that the driving gears 111 and 121 are rotated clockwise, and the main mount 30 and the auxiliary mount 40 are deployed forward as indicated in the center state (FIG. 5B).

Next, when the first motor 110 and the second motor 120 are operated continuously and a flat state in which an angle between the main mount 30 and the auxiliary mount 40 is 180 degrees is made as indicated by the right state (FIG. 5C), the operations of the motors 110 and 120 are stopped, and an unfolded state of the display unit 20 mounted on the main mount 30 and the auxiliary mount 40 is maintained, such that an environment outside the vehicle is displayed in this state.

The display apparatus 1 according to the present disclosure may perform a tilting operation of adjusting an angle of the display unit 20 in the state in which the display unit 20 is completely unfolded as described above.

FIGS. 6A, 6B, 7A, and 7B are operating state views illustrating states in which the display unit of the display apparatus according to the present disclosure is tilted, in which FIG. 6A is a view illustrating a state in which the display unit is tilted leftward, FIG. 6B is a view illustrating a state in which the drive unit operates by being tilted leftward, FIG. 7A is a view illustrating a state in which the drive unit is tilted rightward, and FIG. 7B is a view illustrating a state in which the drive unit operates by being tilted rightward.

First, referring to FIGS. 6A and 6B, in order to tilt the completely unfolded display unit 20 in a left direction as illustrated in FIG. 6A, the first motor 110 is rotated clockwise to rotate the auxiliary mount 40 forward, and the second motor 120 is rotated counterclockwise to rotate the main mount 30 rearward, such that the auxiliary mount 40 and the main mount 30 are simultaneously rotated to the left, and the display unit 20 mounted on the auxiliary mount 40 and the main mount 30 is also tilted to the left along the auxiliary mount 40 and the main mount 30.

Referring to FIGS. 7A and 7B, in order to tilt the completely unfolded display unit 20 in a right direction as illustrated in FIG. 7A, the first motor 110 is rotated counterclockwise to rotate the auxiliary mount 40 rearward, and the second motor 120 is rotated clockwise to rotate the main mount 30 forward, such that the auxiliary mount 40 and the main mount 30 are simultaneously rotated to the right, and the display unit 20 mounted on the auxiliary mount 40 and the main mount 30 is also tilted to the right along the auxiliary mount 40 and the main mount 30.

The display unit 20 of the display apparatus 1 according to the present disclosure performs an operation of pushing the front cover 41 of the auxiliary mount 40 outward in order to prevent a boundary line portion between a portion of the display unit 20 mounted on the auxiliary mount 40 and a portion of the display unit 20 mounted on the main mount 30 from being wrinkled when the display unit 20 is completely deployed as the auxiliary mount 40 and the main mount 30 are unfolded.

FIGS. 8A and 8B are perspective views illustrating states in which the spring operates when the display unit of the display apparatus according to the present disclosure is folded and deployed. As illustrated in FIGS. 8A and 8B, when the display unit 20 is folded as indicated in the left part (FIG. 8A), the front cover 41 of the auxiliary mount 40 receives force in a direction toward the main mount 30, such that the pushers 49 inserted into the long holes 47 compress the springs 48. However, when the display unit 20 is deployed as indicated in the right part (FIG. 8B), the display unit 40 is unfolded, and the front cover 41 of the auxiliary mount 40 is moved in a direction opposite to the direction toward the main mount 30, such that the springs 49 compressed by the pushers 49 inserted into the long holes 47 are extended along with the movement of the front cover 41, tension is applied to the pushers 49 inserted into the long holes 47, and the display unit 20 mounted on the front cover 41 of the auxiliary mount 40 is tensely unfolded. As a result, it is possible to minimize a wrinkle of the boundary line portion between the portion of the display unit 20 mounted on the auxiliary mount 40 and the portion of the display unit 20 mounted on the main mount 30.

FIG. 9 illustrates an example in which the display apparatus 1 is applied to show an area behind the vehicle. When the vehicle is started, the display unit 20 folded in the housing 10 of the display apparatus 1 according to the present disclosure installed on each of the two trim quarter glass trim portions of the front door part in the interior space of the vehicle is unfolded and deployed from the housing 10 as the main mount 30 and the auxiliary mount 40 are moved forward by the operations of the first and second motors 110 and 120 of the drive unit 100. At the same time, the auxiliary mount 40 is moved by the tension of the springs 48, and thus the display unit 20 is tensely unfolded. In this state, the display unit 20 is tilted to the left or right to ensure a viewing angle required for the driver. Thereafter, the electronic control unit (ECU) of the vehicle displays, on the display unit 20, data of rear images produced by a rear camera 200 installed on the vehicle, thereby providing a rear visual field to the driver.

Meanwhile, the display apparatus 1 according to the present disclosure enables the driver to intuitively recognize the perspective from a vehicle approaching from the rear side by displaying different vehicles on the display unit 20 with different colors in accordance with distances between the vehicles. For example, when a distance between the vehicle equipped with the display apparatus according to the present disclosure and another vehicle is 0 m to 5 m, the border of the corresponding vehicle may be colored in red. When a distance between the vehicles is 5 m to 10 m, the border of the corresponding vehicle may be colored in blue.

The display apparatus 1 according to the present disclosure may display a front image and a lateral image of the vehicle as well as a rear image of the vehicle. As illustrated in FIG. 10 illustrating an example in which the display apparatus is applied to display the front or lateral image of the vehicle, when a signal for instructing the electronic control unit (ECU) of the vehicle to display both the front and lateral images is inputted, the electronic control unit (ECU) of the vehicle may display the image data of the front and lateral images produced by a front camera 210 and a lateral camera 220 installed on the vehicle on the folded display unit 20 or the deployed display unit 20 as illustrated in FIG. 10, thereby providing the driver with front and lateral visual fields.

FIGS. 11 and 12 are flowcharts of methods of controlling the display apparatus according to the present disclosure, in which FIG. 11 is a flowchart of a control method when deploying the display unit of the display apparatus, and FIG. 12 is a flowchart of a control method when tilting the display unit of the display apparatus.

First, the control method when deploying the display unit 20 according to the present disclosure will be described with reference to FIG. 11. The electronic control unit (ECU) of the vehicle determines whether a key of the vehicle is turned on (e.g., whether the key of the vehicle is inserted into a key box and positioned at a Key ON position or whether a smart key of the vehicle is recognized by the electronic control unit (ECU)) (S1), and the electronic control unit (ECU) determines whether the vehicle is started (start ON) in the Key ON state (S2).

Next, when the vehicle is started, the electronic control unit (ECU) operates the drive unit 100 of the display apparatus 1 to unfold and deploy the display unit 20 (S3) and to display, on the display unit 20, the rear image of the vehicle produced by the rear camera 210 (S4).

The electronic control unit (ECU) monitors a situation of the vehicle (S5). When the vehicle is turned off, the electronic control unit (ECU) operates the drive unit 100 of the display apparatus 1 to fold the deployed display unit 20 (S6). Thereafter, the rear image is displayed for a predetermined time (in the exemplary embodiment of the present disclosure, the display of the rear image is maintained for approximately 30 seconds) (S7), and then the display of the rear image on the display unit 20 is stopped (S8).

When it is detected that the window of the front door of the vehicle is opened (S9) during the monitoring in step S5, the electronic control unit (ECU) operates the drive unit 100 to fold the display unit 20 (S10). The electronic control unit (ECU) determines whether an input signal (e.g., front and lateral display input switches installed on a console or a door frame of the vehicle) requesting to display the front and lateral images of the vehicle is inputted (S11). When the input signal requesting to display the front and lateral images is inputted, the electronic control unit (ECU) displays, on the folded display unit 20, the front and lateral images produced by the front camera 210 and the lateral camera 220 (S12), and the process returns back to the vehicle monitoring step (S5).

However, in step S9, when it is not detected that the window of the front door of the vehicle is opened (S9), the electronic control unit (ECU) in step S11 determines whether an input signal (e.g., front and lateral display input switches installed on a console or a door frame of the vehicle) requesting to display the front and lateral images of the vehicle is inputted (S11). When the input signal requesting to display the front and lateral images is inputted, the electronic control unit (ECU) displays, on the deployed display unit 20, the front and lateral images produced by the front camera 210 and the lateral camera 220 (S12), and the process returns back to the vehicle monitoring step (S5).

Next, the control method when tilting the display unit 20 according to the present disclosure will be described with reference to FIG. 12. The electronic control unit (ECU) of the vehicle determines whether the display unit 20 is tilted in an automatic mode or a manual mode (S20). In the case of the automatic mode, the electronic control unit (ECU) reads setting information about tilting angles predetermined by the driver and stored in a memory (not illustrated) (S21), operates the drive unit 100 to deploy and unfold the display unit 20 (S22), and then operates the drive unit 100 to adjust a tilting angle of the display unit 20 to an angle that conforms to the read setting information (S23).

In contrast, in step S20, when the display unit 20 is tilted in the manual mode, the electronic control unit (ECU) receives an angle adjustment input signal from an outside mirror angle adjustment switch 300 installed on the door frame of the vehicle as illustrated in the drawings (S24), and operates the drive unit 100 to adjust a tilting angle of the display unit 20 based on the inputted signal (S25).

What is claimed is:

1. A display apparatus for a vehicle where the display apparatus is adjacently positioned to an interior part of the vehicle, the display apparatus comprising:
    a drive unit provided in the display apparatus;
    a display unit capable of being folded or unfolded by the drive unit; and
    a housing configured to support the display unit, wherein the drive unit is embedded in the housing;
    wherein the display unit further comprises:
        an auxiliary mount positioned on a front surface of the housing; and
        a main mount positioned on a lateral surface of the housing;
    wherein the display unit is mounted on the main mount and the auxiliary mount; and
    wherein the display unit is folded or unfolded as the main mount and the auxiliary mount are moved by the drive unit.

2. The display apparatus of claim 1, wherein the display unit is configured to show an external environment around the vehicle and has flexibility.

3. The display apparatus of claim 1, wherein the display apparatus is installed at a position at which a front lower portion of a window frame and a door upper portion intersect at a driver seat and an auxiliary seat of the vehicle.

4. The display apparatus of claim 1, wherein the main mount further comprises:
    a flat-plate-shaped body having a front surface on which the display unit is mounted; and
    a rear surface which is in contact with the lateral surface of the housing.

5. The display apparatus of claim 4, wherein the auxiliary mount further comprises:
    a body having a front surface to which a front cover is attached;
    a long hole into which a spring is inserted, the long hole being formed in the body; and
    a pusher inserted into the long hole to push the spring toward one side.

6. The display apparatus of claim 5, wherein the main mount further comprises:
    an upper hinge;
    a center hinge; and
    a lower hinge, wherein the upper hinge, the center hinge, and the lower hinge formed in order on the lateral surface of the body from the upper side to the lower side.

7. The display apparatus of claim 6, wherein the main mount further comprises:
    an upper coupling hinge;
    a center upper coupling hinge, wherein the upper coupling hinge and the center upper coupling hinge are coupled to the upper hinge;
    a center lower coupling hinge coupled to the center hinge; and
    a lower coupling hinge coupled to the lower hinge.

8. The display apparatus of claim 1, wherein the drive unit comprises:
    a first motor configured to provide power for moving the auxiliary mount forward or rearward; and a second motor configured to provide power for moving the main mount forward or rearward.

9. The display apparatus of claim 8, wherein the drive unit comprises:
   a driving gear coupled to a shaft of the first motor;
   a pair of driven gears engaging with the driving gear and configured to transmit rotational force;
   an upper driven gear interposed between the hinges of the auxiliary mount and engaging with the driven gear at a rear end;
   a driving gear coupled to a shaft of the second motor;
   a pair of driven gears engaging with the driving gear and configured to transmit the rotational force; and
   a lower driven gear interposed between the hinges of the main mount and engaging with the driven gear at a rear end.

10. The display apparatus of claim 1, wherein the display apparatus is configured to:
    recognize a viewpoint from a vehicle approaching from a rear side by displaying different vehicles on the display unit with different colors in accordance with distances between the vehicles.

11. The display apparatus of claim 1, wherein the display apparatus is configured to:
    execute an electronic control unit (ECU) of the vehicle to provide a driver with front and lateral visual fields of the on the display unit; and
    execute a front camera and a lateral camera installed on the vehicle to capture a front image of the vehicle and a lateral image of the vehicle.

12. The display apparatus of claim 11, wherein the ECU is configured to:
    execute the drive unit to unfold the display unit and to display, on the display unit, a rear image of the vehicle produced by a rear camera when the vehicle starts;
    execute the drive unit to fold the display unit when the ECU detects that a window of a front door is opened;
    determine whether an input signal requesting to display the front image and the lateral image is received when the ECU detects that the window of the front door is opened; and
    display, on the folded display unit, the front image and the lateral image when the input signal is received.

13. The display apparatus of claim 12, wherein the ECU is configured to:
    determine whether the input signal is received when the ECU detects that the window of the front door is not opened; and
    display, on the display unit, the front image and the lateral image when the input signal is received.

* * * * *